United States Patent
Ogawa

(10) Patent No.: US 11,546,342 B2
(45) Date of Patent: Jan. 3, 2023

(54) INFORMATION PROCESSING APPARATUS AND NETWORK CONNECTION DETERMINING METHOD

(71) Applicant: OKI ELECTRIC INDUSTRY CO., LTD., Tokyo (JP)

(72) Inventor: Yohei Ogawa, Tokyo (JP)

(73) Assignee: OKI ELECTRIC INDUSTRY CO., LTD., Tokyo (JP)

(*) Notice: Subject to any disclaimer, the term of this patent is extended or adjusted under 35 U.S.C. 154(b) by 259 days.

(21) Appl. No.: 16/813,936

(22) Filed: Mar. 10, 2020

(65) Prior Publication Data
US 2020/0314108 A1    Oct. 1, 2020

(30) Foreign Application Priority Data
Mar. 28, 2019 (JP) ................. 2019-063681

(51) Int. Cl.
*H04L 29/06* (2006.01)
*H04L 9/40* (2022.01)
(52) U.S. Cl.
CPC ................. *H04L 63/105* (2013.01)
(58) Field of Classification Search
CPC .................................... H04L 63/105
USPC ............................................ 726/4
See application file for complete search history.

(56) References Cited

U.S. PATENT DOCUMENTS

| 8,370,922 B1* | 2/2013 | Doukhvalov | H04L 63/08 726/11 |
| 8,683,193 B1* | 3/2014 | Hansen | H04L 9/40 713/153 |
| 2014/0366152 A1* | 12/2014 | Toubiana | H04L 63/04 726/26 |
| 2015/0046588 A1* | 2/2015 | Martini | H04L 63/08 709/225 |

FOREIGN PATENT DOCUMENTS

JP    2016177672 A    10/2016

OTHER PUBLICATIONS

WiSwitch: Seamless Handover between Multi-Provider Networks, Giordano et al, Jan. 2005 (Year: 2005).*

* cited by examiner

*Primary Examiner* — Jahangir Kabir
(74) *Attorney, Agent, or Firm* — Panitch Schwarze Belisario & Nadel LLP

(57) ABSTRACT

An information processing apparatus includes a first port, a second port, a storage device, and a determining unit. The first port is to be connected to a first network having a first security level. The second port is to be connected to a second network having a second security level. The second security level is lower than the first security level. The storage device holds first setting information for connection to the first network and second setting information for connection to the second network. The determining unit makes network connection to at least the first port in accordance with the second setting information and determines, on the basis of a (Continued)

result from the network connection to at least the first port in accordance with the second setting information, whether the network connection to the first port is made properly.

12 Claims, 14 Drawing Sheets

|  | SETTING INFORMATION 13A | SETTING INFORMATION 13B |
|---|---|---|
| IP ADDRESS | 192.168.10.20 | 192.168.150.60 |
| SUBNET MASK | 255.255.255.0 | 255.255.255.0 |
| DEFAULT GATEWAY | 192.168.10.1 | 192.168.150.1 |
| VARIOUS SETTING VALUES | ......... | ......... |
| SECURITY LEVEL | 5 | 20 |
| NETWORK CONNECTION CONFIRMING METHOD | PRESENCE OF PING RESPONSE | PRESENCE OF PING RESPONSE |
| IP ADDRESS FOR CONFIRMATION OF NETWORK CONNECTION | 192.168.10.100 | 192.168.150.25 |

FIG. 5

| NETWORK SETTING ALLOCATION VALUE 13C ||
|---|---|
| PORT NUMBER | STORAGE LOCATION OF SETTING INFORMATION |
| 1 (FIRST PORT) | C:¥Users¥・・・¥set01.cfg (STORAGE LOCATION OF SETTING INFORMATION 13A) |
| 2 (SECOND PORT) | C:¥Users¥・・・¥set02.cfg (STORAGE LOCATION OF SETTING INFORMATION 13B) |

FIG. 6

```
CHANGE IN NETWORK CONNECTION CONFIGURATION HAS
BEEN DETECTED.
ALL NETWORK COMMUNICATION HAS BEEN STOPPED FOR
SECURITY PURPOSE.
THE FOLLOWING ARE POSSIBLE CAUSES.

• CHANGE IN NETWORK CONFIGURATION
• IMPROPER NETWORK CABLE CONNECTION

CONTACT DEVICE MANAGER FOR DETAIL.

```
CHANGE IN NETWORK CONNECTION CONFIGURATION HAS
BEEN DETECTED.
ALL NETWORK COMMUNICATION HAS BEEN STOPPED FOR
SECURITY PURPOSE.
THE FOLLOWING ARE POSSIBLE CAUSES.

• IMPROPER NETWORK CABLE CONNECTION

CONTACT DEVICE MANAGER FOR DETAIL.

INFORMATION PROCESSING APPARATUS AND NETWORK CONNECTION DETERMINING METHOD

CROSS-REFERENCE TO RELATED APPLICATIONS

The present application claims priority from Japanese Patent Application No. 2019-063681 filed on Mar. 28, 2019, the entire contents of which are hereby incorporated by reference.

BACKGROUND

The technology relates to an information processing apparatus and a network connection determining method.

In recent years, the importance of network security measures is on the rise. Therefore, various security measures have been taken (see, for example, Japanese Unexamined Patent Application Publication No. 2016-177672).

SUMMARY

In some cases, setting information for connection to a network with a high security level is leaked accidentally by human error to a network with a low security level. This case leads to a decrease in the security level of the network with the high security level.

It is desirable to provide an information processing apparatus and a network connection determining method that make it possible to avoid a risk of lowering a security level of a network with a high security level.

According to one embodiment of the technology, there is provided an information processing apparatus that includes a first port, a second port, a storage device, and a determining unit. The first port is to be connected to a first network having a first security level. The second port is to be connected to a second network having a second security level. The second security level is lower than the first security level. The storage device holds first setting information for connection to the st network and second setting information for connection to the second network. The determining unit makes network connection to at least the first port in accordance with the second setting information and determines, on the basis of a result from the network connection to at least the first port in accordance with the second setting information, whether the network connection to the first port is made properly.

According to one embodiment of the technology, there is provided a network connection determining method in an information processing apparatus that includes a first port and a second port. The first port is to be connected to a first network having a first security level. The second port is to be connected to a second network having a second security level lower than the first security level. The network connection determining method includes: making network connection to at least the first port in accordance with setting information for connection to the second network; and determining, on the basis of a result from the making the network connection to at least the first port in accordance with setting information for the connection to the second network, whether the network connection to the first port is made properly.

BRIEF DESCRIPTION OF THE DRAWINGS

FIG. 5 is a diagram illustrating an example of a setting value stored in a storage device illustrated in FIG. 4.

FIG. 6 is a diagram illustrating an example of a network setting allocation value stored in the storage device illustrated in FIG. 4.

FIG. 14 is a diagram illustrating an example of a display in step S320 illustrated in FIG. 13.

FIG. 15 is a diagram illustrating an example of a display in step S420 illustrated in FIG. 13.

DETAILED DESCRIPTION

Figure 1:
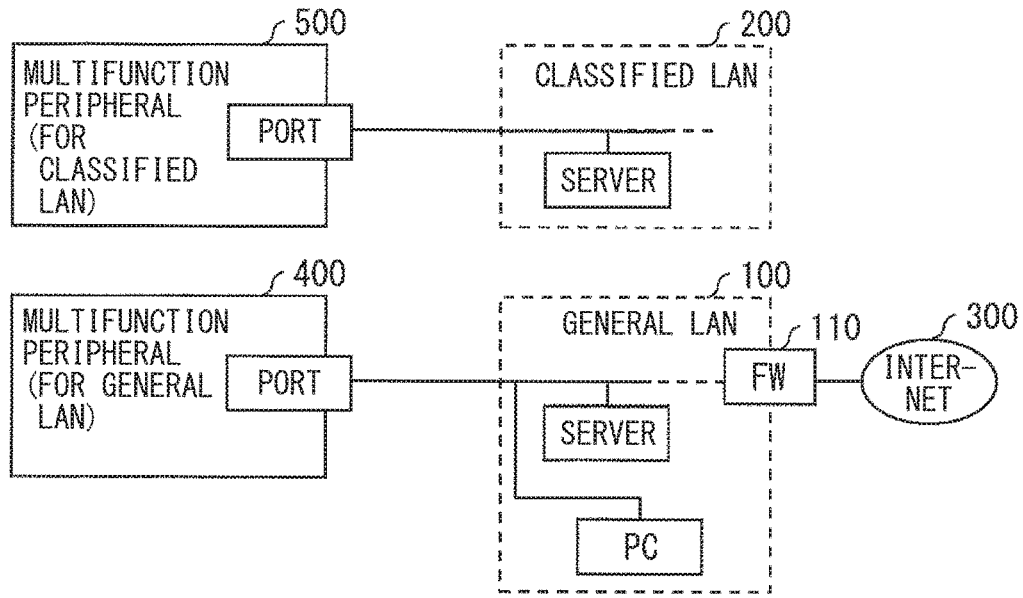
FIG. 1 is a diagram illustrating an example in which a multifunction peripheral is provided for each local area network (LAN).

Hereinafter, some example embodiments of the technology will be described in detail with reference to the drawings. Note that the following description is directed to illustrative examples of the technology and not to be construed as limiting the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description is given in the following order.

1. Background and Issues for One Embodiment of the Technology
2. Example Embodiment
3. Modification Examples

1. BACKGROUND AND ISSUES FOR ONE EMBODIMENT OF THE TECHNOLOGY

Typically, a terminal may connect only to a single network to communicate with another terminal. In some cases, however, a terminal may be required to connect simultaneously to two or more independent networks.

For example, as illustrated in FIG. 1, a wired local area network (LAN) with enhanced security directed to, for example but not limited to, protection of personal information may be present in addition to a wired LAN for use in general administrative work in an establishment such as a retail store or a hospital. The wired LAN with the enhanced security may be referred to below as a "classified LAN 200", and the wired LAN for use in general administrative work may be referred to below as a "general LAN 100". The general LAN 100 may be connected to the Internet 300 via, for example but not limited to, a firewall 110, and this connection may not be sufficiently secure for handling, for example but not limited to, personal information. The classified LAN 200 may have no physical connection to the general LAN 100 and may be hidden in order to maintain the security. No communication may be carried out between the classified LAN 200 and the general LAN 100. Therefore, when printing is to be performed through the general LAN 100, a multifunction peripheral 400 connected to the general LAN 100 may need to be used, for example. When printing is to be performed through the classified LAN 200, a multifunction peripheral 500 connected to the classified LAN 200 may need to be used, for example. In this case, a user may experience inconvenience of preparing the two multifunction peripherals 400 and 500.

Figure 2:
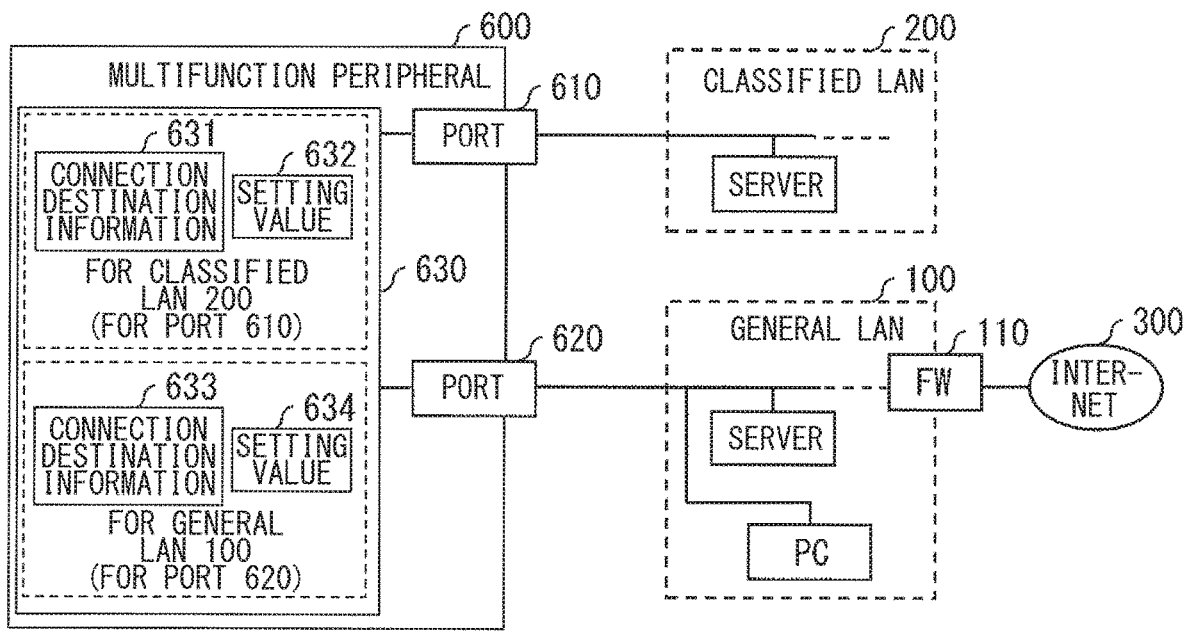
FIG. 2 is a diagram illustrating an example in which a single multifunction peripheral is shared by a plurality of LANs.

To meet the user's demand that the number of multifunction peripherals that the user is to own be as small as possible, a multifunction peripheral 600 as illustrated in FIG. 2 that includes two wired LAN ports, i.e., ports 610 and 620, to allow for simultaneous connection to both the general LAN 100 and the classified LAN 200 has been developed and is being sold. The multifunction peripheral 600 may include a storage device 630, and the storage device 630 may hold, for the port 610, connection destination information 631 and a setting value 632. Non-limiting examples of the connection destination information 631 may include an Internet Protocol (IP) address. The setting value 632 may be directed to distinguishing of the classified LAN 200 from the general LAN 100. The connection destination information 631 and the setting value 632 may be data for the classified LAN 200, i.e., for the port 610. The storage device 630 of the multifunction peripheral 600 may further hold, for the port 620, connection destination information 633 and a setting value 634. Non-limiting examples of the connection destination information 633 may include an IP address. The setting value 634 may be directed to distinguishing of the general LAN 100 from the classified LAN 200. The connection destination information 633 and the setting value 634 may be data for the general LAN 100, i.e., for the port 620.

The multifunction peripheral 600 may connect to and communicate with the general LAN 100 or the classified LAN 200 separately in accordance with various settings such as the connection destination information 631 and 633 or the setting values 632 and 634 for the respective ports 610 and 620 stored in the storage device 630. Furthermore, when the multifunction peripheral 600 is to store therein data received from the general LAN 100 or the classified LAN 200, the multifunction peripheral 600 may add, for example but not limited to, a tag to each piece of the received data to distinguish each piece of the received data from another piece of the received data. This makes it possible to keep the information inside the classified LAN 200 from leaking to outside and to maintain the security of the classified LAN 200.

Figure 3:
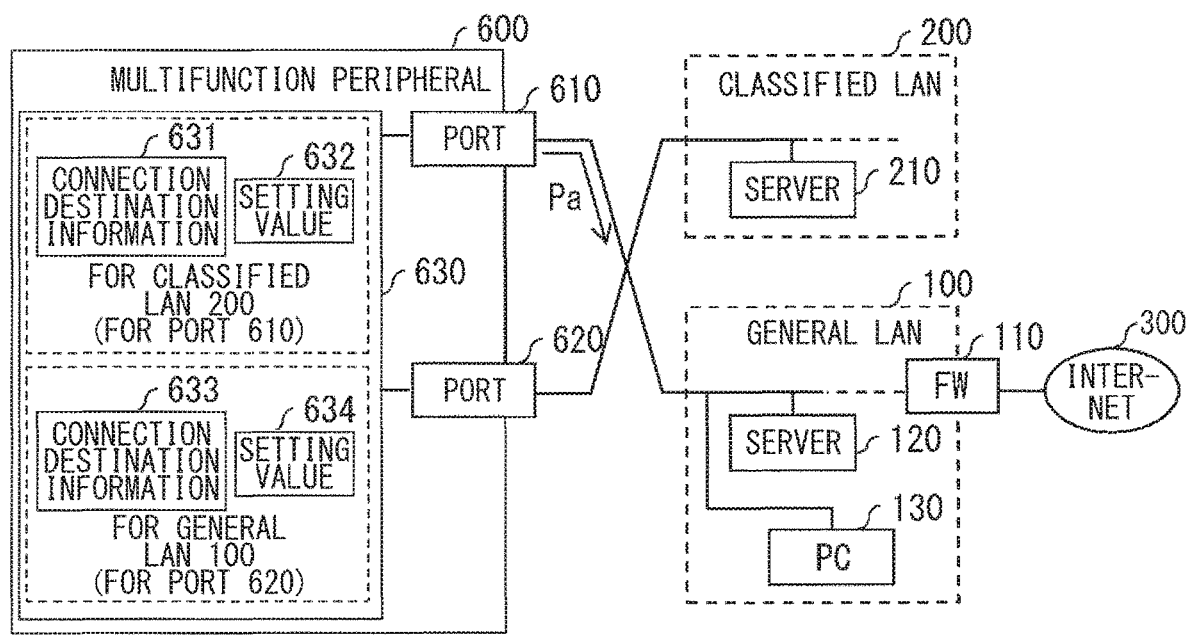
FIG. 3 is a diagram illustrating an example in which the multifunction peripheral illustrated in FIG. 2 is in reversed connection.

In such a multifunction peripheral 600, the setting values 632 and 634 may each be determined uniquely for the ports 610 and 620, respectively. As illustrated in FIG. 3, there is, however, a possibility that the connections of the general LAN 100 and the classified LAN 200 to the ports 610 and 620 are reversed from the proper connections illustrated in FIG. 2 after, for example but not limited to, moving the multifunction peripheral 600. The connections being reversed from the proper connections may be referred to as being "in reversed connection". In a case where the ports 610 and 620 are in reversed connection, the multifunction peripheral 600 may be unable to communicate properly with either the general LAN 100 or the classified LAN 200, and the user may be unable to use the multifunction peripheral 600 in either the general LAN 100 or the classified LAN 200. Furthermore, in a case where the ports 610 and 620 are in reversed connection, there is a possibility that unexpected communication occurs at the port 610 to which the classified LAN 200 is supposed to be connected. In a case where such unexpected communication occurs, there is a possibility that the security of the classified LAN 200 is lowered, as will be described below, for example.

For example, as illustrated in FIG. 3, in a case where the ports 610 and 620 are in reversed connection, in order to transmit data to a server 210 connected to the classified LAN 200, the multifunction peripheral 600 may make an inquiry to the general LAN 100 via the port 610 about the connection to the server 210. In a case where the multifunction peripheral 600 transmits a packet Pa that includes the IP address of the server 210 included in the connection destination information 631 to the general LAN 100 via the port 610 at this point, the packet Pa may reach all of the terminals connected to the general LAN 100, including a server 120 and a personal computer (PC) 130. In a case where the server 120 or the PC 130 is infected with a computer virus, allowing a packet for the general LAN 100 to be picked up or in a case where a terminal of a third party is connected to the general LAN 100, there is a possibility that the presence of the classified LAN 200 or the presence of the server 210 connected to the classified LAN 200 becomes known to the third party as the packet Pa is transmitted into the general LAN 100. This means that the confidentiality of the classified LAN 200 or the security level of the classified LAN 200 can be notably lowered.

In a case where the packet Pa includes data, the data is allowed to be protected through encryption. Appropriate encryption may therefore prevent leakage of the data included in the packet Pa. It is, however, difficult to encrypt an IP address in typical encrypted communication since a router or a hub serving as a relay finds the transmission destination of the packet Pa. The third party is therefore able to find the IP address with ease by receiving only the packet Pa. Therefore, the multifunction peripheral 600 may be required to determine whether the ports 610 and 620 are not in reversed connection while keeping the security level of the classified LAN 200 from being lowered, before the multifunction peripheral 600 transmits the IP address of the server 210 connected to the classified LAN 200. An example embodiment of the technology that allows for such a determination will be described below.

2. EXAMPLE EMBODIMENT

[Configuration]

Figure 4:
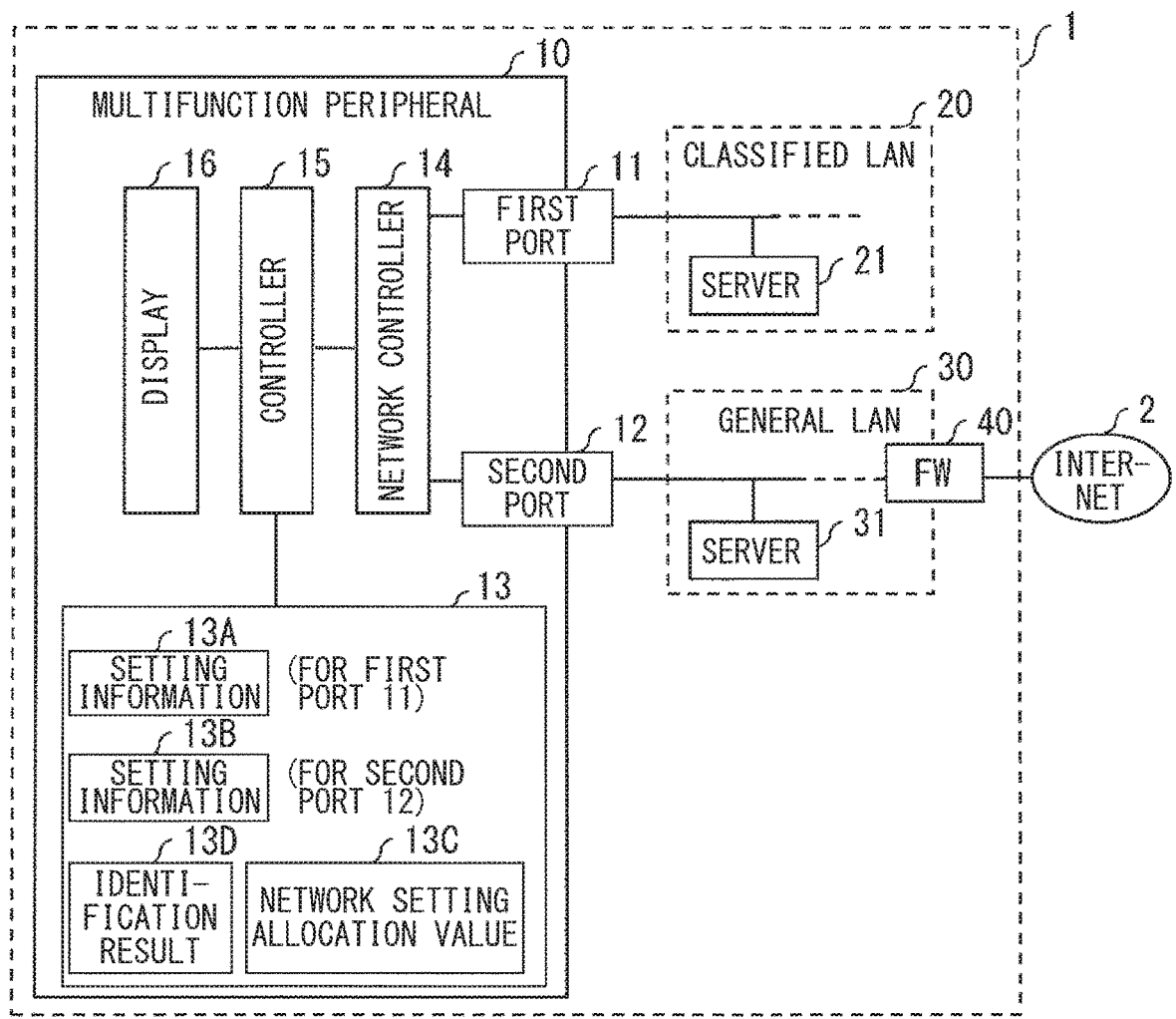
FIG. 4 is a diagram illustrating an example of a schematic configuration of an information processing system that includes a multifunction peripheral according to an example embodiment of the technology.

FIG. 4 illustrates an example of a schematic configuration of an information processing system 1 that includes a multifunction peripheral 10 according to an example embodiment of the technology. The information processing system 1 may include, for example but not limited to, a multifunction peripheral 10, a classified LAN 20, a general LAN 30, and a firewall 40. The general LAN 30 may be connected to the Internet 2 via the firewall 40. A server 21 may be connected to the classified LAN 20, for example. A server 31 may be connected to the general LAN 30, for example. The classified LAN 20 may correspond to a "first network" in one specific but non-limiting embodiment of the technology. The general LAN 30 may correspond to a "second network" in one specific but non-limiting embodiment of the technology.

The classified LAN 20 and the general LAN 30 may each be a network that is able to communicate through a communication standard common to both. The classified LAN 20 and the general LAN 30 may each be a network that communicates through a communication protocol, e.g., transmission control protocol/Internet protocol (TCP/IP), used as a standard in the Internet, for example. In one example embodiment, the classified LAN 20 and the general LAN 30 may each be a network that is able to communicate through a communication standard different from each other. The classified LAN 20 and the general LAN 30 may be separated from each other physically or logically. The classified LAN 20 may not be connected to the Internet 2. Therefore, no communication may occur between the classified LAN 20 and the general LAN 30. Accordingly, the possibility that information in the classified LAN 20 leaks to the Internet 2 from the classified LAN 20 may be low, which may make the classified LAN 20 a network with a high security level. In contrast, the general LAN 30 may be connected to the Internet 2, and there is a possibility that information in the general LAN 30 leaks to the Internet 2 from the general LAN 30. Accordingly, the general LAN 30 may be a network with a security level lower than the security level of the classified LAN 20. The security level of the classified LAN 20 may correspond to a "first security level" in one specific but non-limiting embodiment of the technology. The security level of the general LAN 30 may correspond to a "second security level" in one specific but non-limiting embodiment of the technology.

As illustrated in FIG. 4, the multifunction peripheral 10 may include two wired LAN ports, i.e., a first port 11 and a second port 12, for example. The classified LAN 20 may be connected to the first port 11. The general LAN 30 may be connected to the second port 12. As illustrated in FIG. 4, the multifunction peripheral 10 may further include a storage device 13, for example. The storage device 13 may hold setting information 13A directed to connection to the classified LAN 20, setting information 13B directed to connection to the general LAN 30, and a network setting allocation value 13C. The setting information 13A may be data for the first port 11. The setting information 13A may correspond to "first setting information" in one specific but non-limiting embodiment of the technology. The setting information 139 may be data for the second port 12. The setting information 13B may correspond to "second setting information" in one specific but non-limiting embodiment of the technology.

As illustrated in FIG. 5, the setting information 13A and the setting information 13B may each include, for example but not limited to, an IP address of the multifunction peripheral 10, a subnet mask of the multifunction peripheral 10, a default gateway of the multifunction peripheral 10, and various other setting values required for TCP/IP connection. As illustrated in FIG. 5, the setting information 13A and the setting information 13B may each further include, for example but not limited to, the security level of a connection destination network, a network connection confirming method, and a destination IP address for confirmation of network connection. The connection destination network may be a network to which connection is to be made. The setting information 13A may include, for example but not limited to, the security level of the classified LAN 20, a method of confirming the connection to the classified LAN 20, and a destination IP address for confirmation of the connection to the classified LAN 20. The setting information 13B may include, for example but not limited to, the security level of the general LAN 30, a method of confirming the connection to the general LAN 30, and a destination IP address for confirmation of the connection to the general LAN 30.

In the setting information 13A and the setting information 13B, the security level may be expressed by a unique positive integer, for example. A smaller value may indicate a higher security level of a network. In the example embodiment, the security level of the general LAN 30 may be set to a value greater than the value for the security level of the classified LAN 20. In the setting information 13A and the setting information 13B, the network connection confirming method may indicate a technique to be used to confirm network connection. In the setting information 13A and the setting information 13B, the destination IP address for confirmation of network connection may be an IP address to be used to make a connection attempt to any desired address within a network in order to confirm the network connection. The destination IP address for confirmation of network connection in the setting information 13A may be the IP address of the server 21, for example. The destination IP address for confirmation of network connection in the setting information 13B may be the IP address of the server 31, for example. In the example embodiment, the connection to a network may be confirmed on the basis of the presence of a ping response to a specific IP address.

The network setting allocation value 13C may describe a correspondence relationship, i.e., a combination, of a port and a network. For example, as illustrated in FIG. 6, the port number of the first port 11 and a storage location of setting information of a network to be connected to the first port 11, e.g., a storage location of the setting information 13A, may be associated with each other in the network setting allocation value 13C. Furthermore, for example, the port number of the second port 12 and a storage location of setting information of a network to be connected to the second port 12, e.g., a storage location of the setting information 13B, may be associated with each other in the network setting allocation value 13C. The multifunction peripheral to may read out the network setting allocation value 13C to find that the classified LAN 20 is to be connected to the first port 11 and that the general LAN 30 is to be connected to the second port 12.

As illustrated in FIG. 4, the multifunction peripheral 10 may further include, for example but not limited to, a network controller 14, a controller 15, and a display 16. The network controller 14 may control network communication. The controller 15 may perform various processes such as network identification. The display 16 may display a notification. The network controller 14 and the controller 15 may correspond to a "determining unit" in one specific but non-limiting embodiment of the technology.

[Operation]

Figure 7:
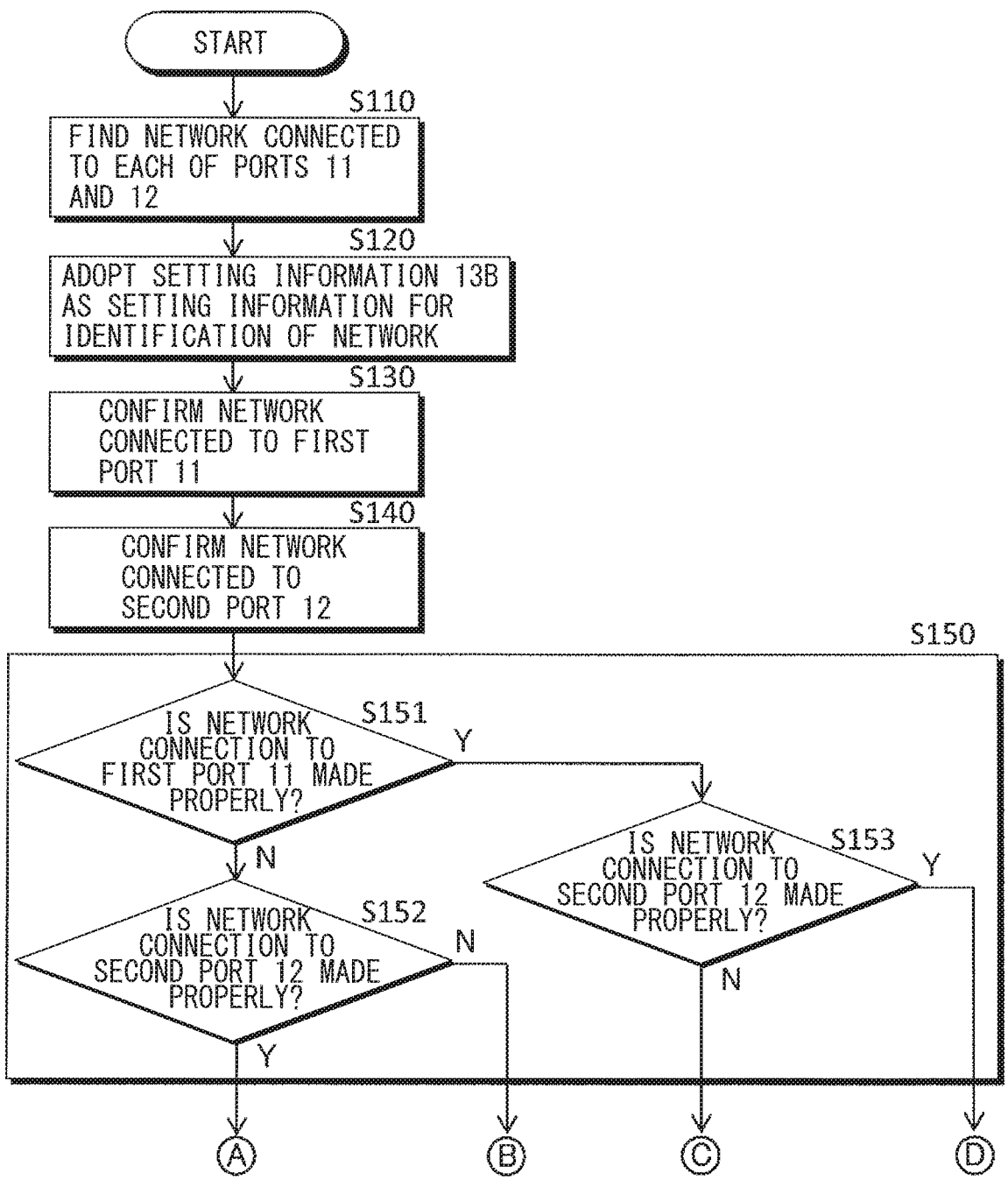
FIG. 7 is a diagram illustrating an example of a network connection operation procedure of the multifunction peripheral illustrated in FIG. 4.

Next, an example of network connection operation of the multifunction peripheral 10, i.e., the network controller 14 and the controller 15, will be described. FIG. 7 illustrates an example of an network connection operation procedure of the multifunction peripheral 10. When the multifunction peripheral 10 starts or when the multifunction peripheral 10 is restored to a state in which the multifunction peripheral 10 is able to perform network communication from a state in which the multifunction peripheral 10 is unable to monitor the network connection, there is a possibility that the networks to which the first port 11 and the second port 12 are connected have changed while the networks have not been monitored. Therefore, the multifunction peripheral 10 may identify a connection destination network in accordance with the procedures illustrated in FIG. 7.

First, in step S110, the multifunction peripheral 10 may find a network to be connected to each port. In a specific but non-limiting example, the multifunction peripheral 10 may read out the network setting allocation value 13C stored in the storage device 13 and find that the classified LAN 20 is to be connected to the first port 11 and the general LAN 30 is to be connected to the second port 12 on the basis of the security levels in the setting information set for the respective ports.

Thereafter, the multifunction peripheral 10 may read out the information 13A and the setting information 13B from the storage device 13 on the basis of the storage locations of the respective pieces of setting information of the networks to be connected to the respective ports described in the network setting allocation value 13C. Thereafter, in step S120, the multifunction peripheral 10 may compare the security levels described in the setting information 13A and the setting information 13B and adopt the setting information, i.e., the setting information 13B, with a lower security level as the setting information for identification of the connection destination network.

Figure 8:
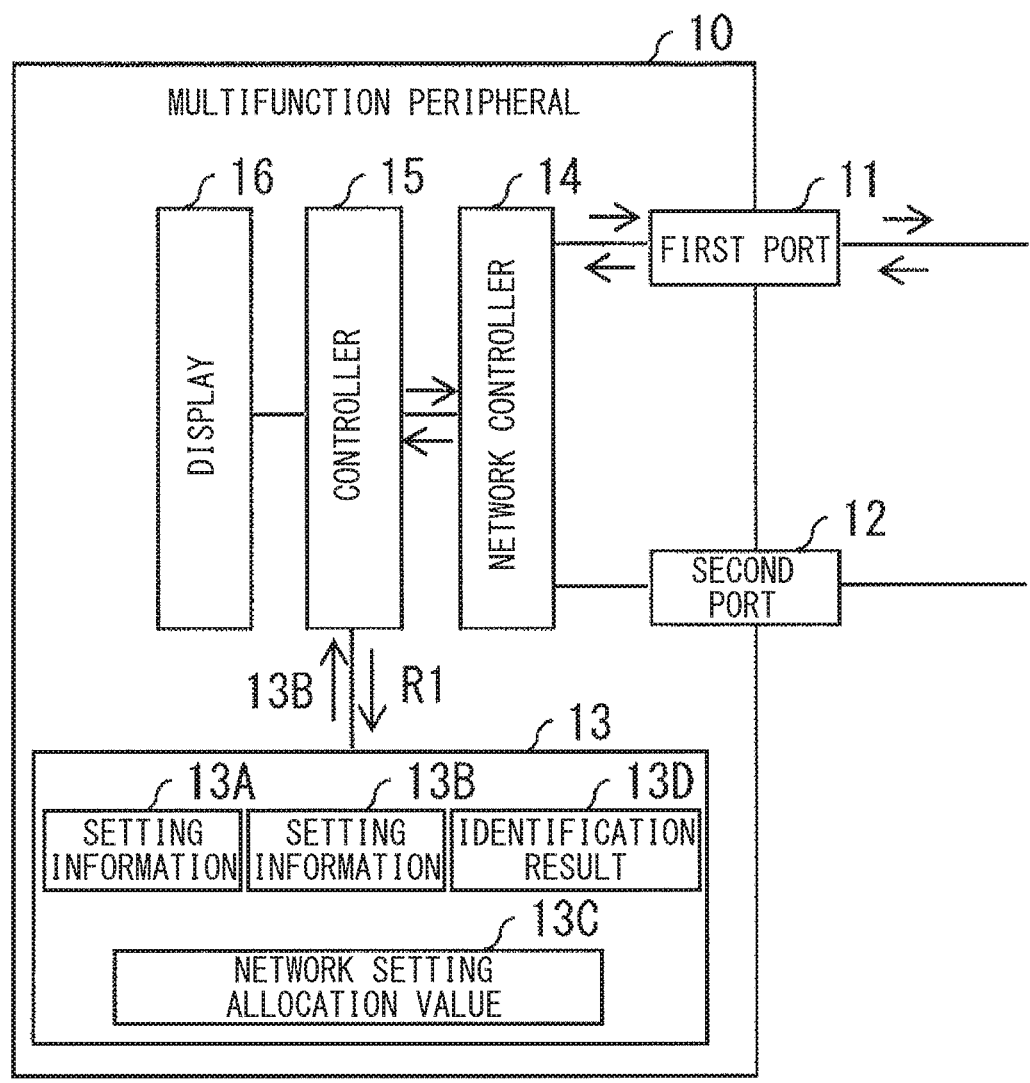
FIG. 8 is a diagram illustrating an example of operation of the multifunction peripheral in step S130 illustrated in FIG. 7.
Figure 9:
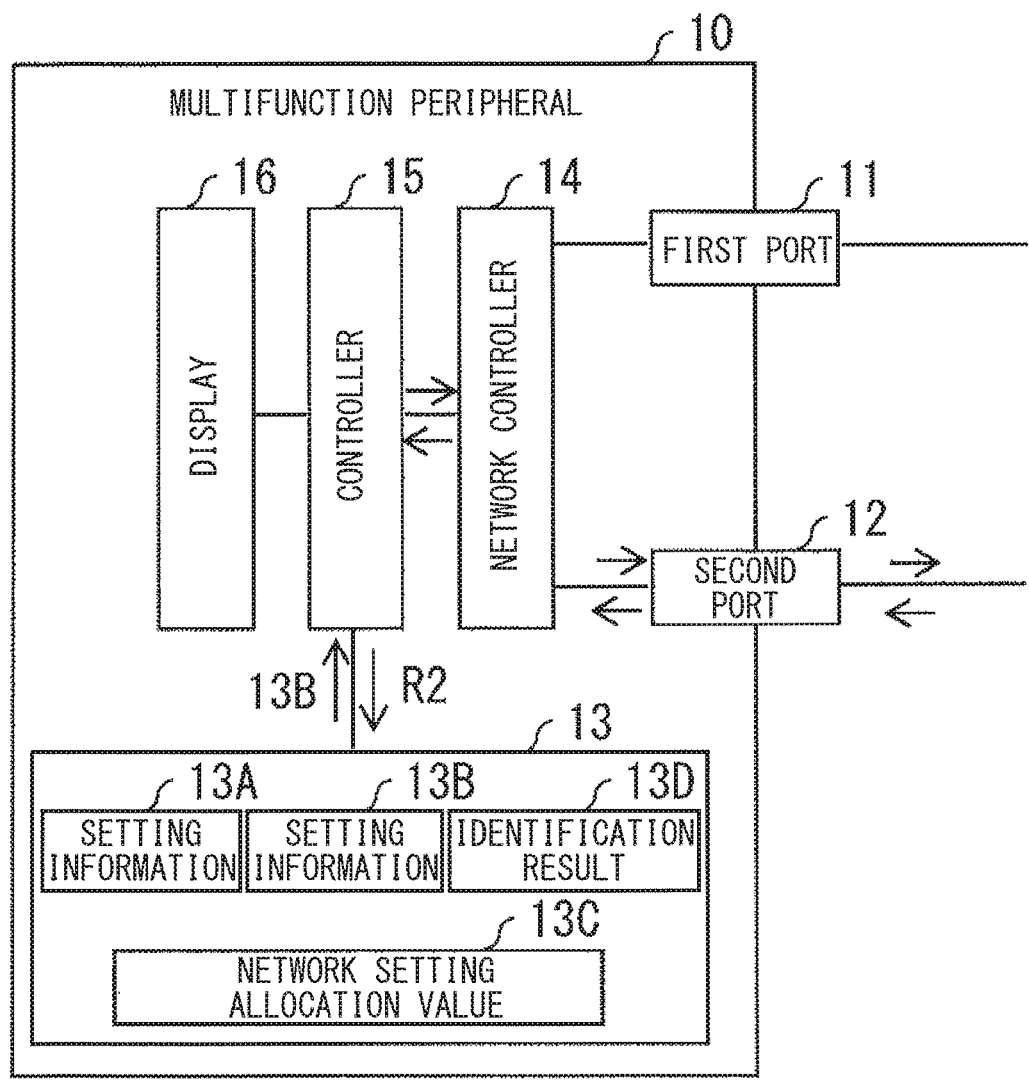
FIG. 9 is a diagram illustrating an example of operation of the multifunction peripheral in step S140 illustrated in FIG. 7.

Thereafter, in step S130, the multifunction peripheral 10 may confirm the connection of the network connected to the first port 11 in accordance with the network connection confirming method described in the setting information 13B, as illustrated in FIG. 8. For example, the multifunction peripheral 10 may determine whether the network connection is made properly, on the basis of whether the connection to the destination IP address for confirmation of the network connection included in the setting information 13B is successful in the network connected to the first port 11. For example, the multifunction peripheral 10 may determine whether the network connection to the first port 11 is made properly, on the basis of whether a proper response to an inquiry, i.e., a ping, based on the setting information 13B is received. The multifunction peripheral 10 may store a result R1 from the determination into an identification result 13D within the storage device 13, as illustrated in FIG. 8. Thereafter, in step S140, the multifunction peripheral 10 may confirm the connection of the network connected to the second port 12 in accordance with the network connection confirming method described in the setting information 13B, as illustrated in FIG. 9. For example, the multifunction peripheral 10 may determine whether the network connection is made properly on the basis of whether the connection to the destination IP address for confirmation of the network connection included in the setting information 13B is successful in the network connected to the second port 12. For example, the multifunction peripheral 10 may determine whether the network connection to the second port 12 is made properly, on the basis of whether a proper response to an inquiry, i.e., a ping, based on the setting information 13B is received. The multifunction peripheral 10 may store a result R2 from the determination into the identification result 13D within the storage device 13, as illustrated in FIG. 9.

Figure 10:
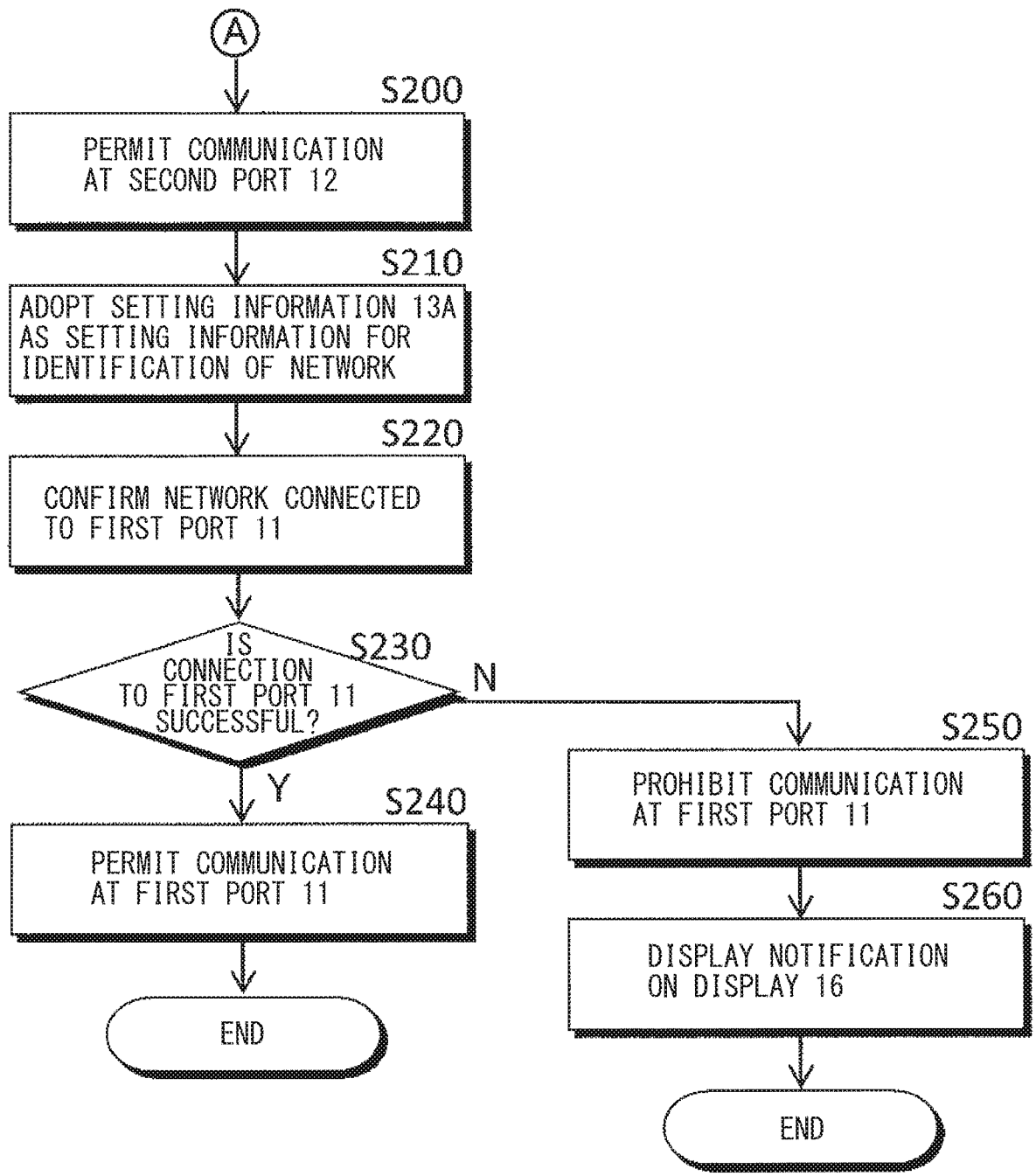
FIG. 10 is a diagram illustrating an example of operation that follows A illustrated in FIG. 7.

Thereafter, in step S150, on the basis of the identification result 13D in the storage device 13, the multifunction peripheral 10 may determine whether the network connection to each of the first port 11 and the second port 12 is made properly. First, in step S151, on the basis of the result R1 included in the identification result 13D, the multifunction peripheral 10 may determine whether the network connection to the first port 11 is made properly, for example. In a case where it is determined, as a result, that the network connection to the first port 11 is not made properly (N in step S151), in step S152, the multifunction peripheral 10 may determine whether the network connection to the second port 12 is made properly. In a case where it is determined, as a result, that the network connection to the second port 12 is made properly (Y in step S152), this may reveal that a network different from the general LAN 30 is connected to the first port 11 and the general LAN 30 is connected to the second port 12. In other words, this may reveal that the first port 11 and the second port 12 are not in reversed connection. Therefore, in step S200 illustrated in FIG. 10, the multifunction peripheral 10 may permit communication, i.e., transmission and reception, through the general LAN 30 with the use of the setting information 13B at the second port 12.

Figure 11:
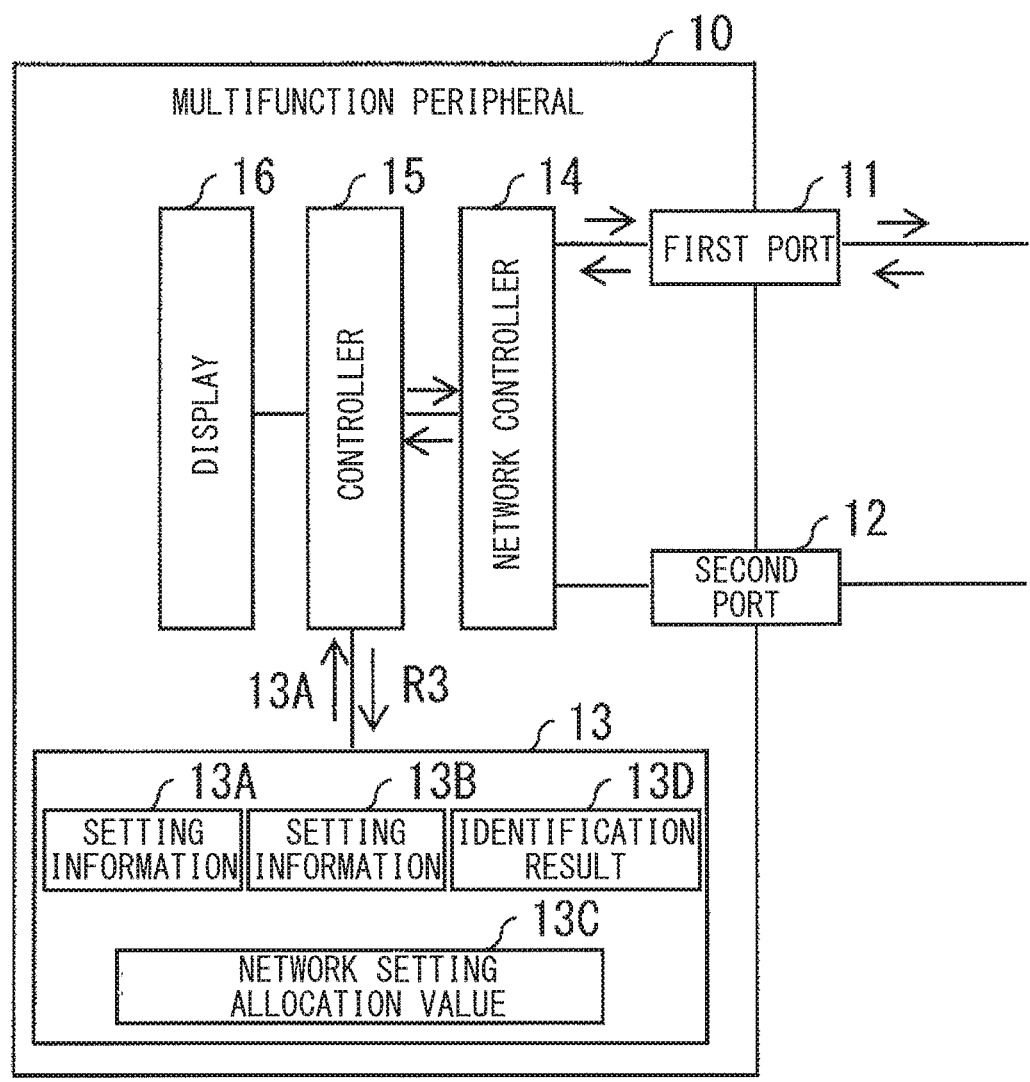
FIG. 11 is a diagram illustrating an example of operation of the multifunction peripheral in step S220 illustrated in FIG. 10.

Thereafter, in step S210, the multifunction peripheral 10 may adopt the setting information, i.e., the setting information 13A, with a higher security level as the setting information for identification of the connection destination network. Thereafter, in step S220, in accordance with the network connection confirming method described in the setting information 13A, the multifunction peripheral 10 may confirm the connection of the network connected to the port, i.e., the first port 11, for which it has been determined that the network connection has not been made properly on the basis of the setting information 13B, as illustrated in FIG. 11. The multifunction peripheral 10 may store a result R3 from the determination into the identification result 13D within the storage device 13, as illustrated in FIG. 11.

Thereafter, in step S230, on the basis of the result R3 included in the identification result 13D, the multifunction peripheral 10 may determine whether the network connection is made properly to the port, i.e., the first port 11, for which it has been determined that the network connection has not been made properly on the basis of the setting information 13B. In a case where it is determined, as a result, that the network connection to the first port 11 is made properly (Y in step S230), this may reveal that the classified LAN 20 is connected to the first port 11. Therefore, in step S240, the multifunction peripheral 10 may permit communication, i.e., transmission and reception, through the classified LAN 20 with the use of the setting information 13A at the first port 11. At this point, it may be revealed that the classified LAN 20 is connected to the first port 11 and the general LAN 30 is connected to the second port 12. This case may mean that the networks are connected in accordance with the proper connection mode as originally expected. Therefore, the multifunction peripheral 10 may be able to communicate with each of the classified LAN 20 and the general LAN 30.

Figures 12, 13:
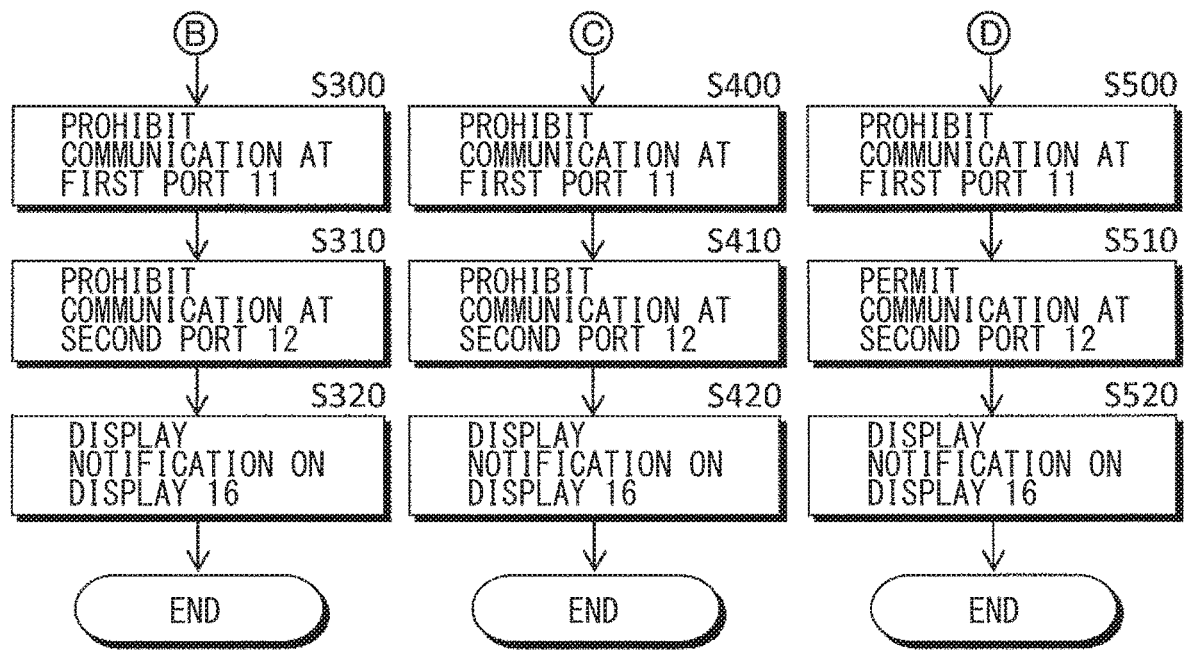
FIG. 12 is a diagram illustrating an example of a display in step S260 illustrated in FIG. 10.
FIG. 13 is a diagram illustrating an example of operation that follows each of B, C, and D illustrated in FIG. 7.

In contrast, in a case where it is determined in step S230 that the network connection to the first port 11 is not made properly (N in step S230), this may reveal that a network that is neither the general LAN 30 nor the classified LAN 20 is connected to the first port 11. In this case, the multifunction peripheral 10 may consider that the configuration of the network to be connected to the first port 11 has changed. As a result, in step S250 illustrated in FIG. 10, the multifunction peripheral 10 may prohibit communication, i.e., transmission and reception, in the network connected to the first port 11. Furthermore, in step S260 illustrated in FIG. 10, the multifunction peripheral 10 may display a notification such as the one illustrated in FIG. 12 on the display 16, for example.

In a case where it is determined in step S152 that the network connection to the second port 12 is not made properly (N in step S152), this may indicate that the network connection has failed in both the first port 11 and the second port 12. This case may mean that a network that is not the general LAN 30 is connected to each of the first port 11 and the second port 12. Therefore, in steps S300 and S310 illustrated in FIG. 13, the multifunction peripheral 10 may prohibit communication, i.e., transmission and reception, in each of the networks connected to the first port 11 and the second port 12. Furthermore, in step S320 illustrated in FIG. 13, the multifunction peripheral 10 may display a notification such as the one illustrated in FIG. 14 on the display 16, for example.

In a case where it is determined in step S151 that the network connection to the first port 11 is made properly (Y in step S151), in step S153 illustrated in FIG. 7 the multifunction peripheral 10 may determine whether the network connection to the second port 12 is made properly. In a case where it is determined, as a result, that the network connection to the second port 12 is not made properly (N in step S153), this may indicate that the network connection to the first port 11 is successful and the network connection to the second port 12 has failed. At this point, it may be revealed that the general LAN 30 is connected to the first port 11 and a network different from the general LAN 30 is connected to the second port 12. In this case, the multifunction peripheral 10 may determine that the classified LAN 20 and the general LAN 30 are connected improperly to the first port 11 and the second port 12. In other words, the multifunction peripheral 10 may determine that the first port 11 and the second port 12 are in reversed connection. Therefore, in steps S400 and S410 illustrated in FIG. 13, the multifunction peripheral 10 may prohibit communication, i.e., transmission and reception, in each of the networks connected to the first port 11 and the second port 12. Furthermore, in step S420 illustrated in FIG. 13, the multifunction peripheral 10 may display a notification such as the one illustrated in FIG. 15 on the display 16, for example.

Figure 16:
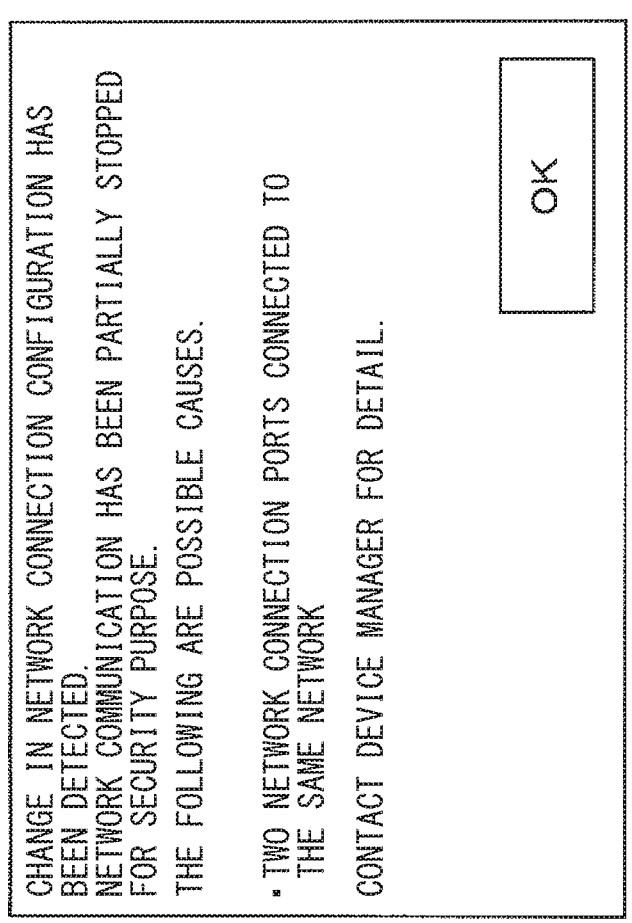
FIG. 16 is a diagram illustrating an example of a display in step S520 illustrated in FIG. 13.

In a case where it is determined in step S153 that the network connection to the second port 12 is made properly (Y in step S153), this may reveal that the general LAN 30 is connected to both of the first port 11 and the second port 12. Therefore, in steps S500 and S510 illustrated in FIG. 13, the multifunction peripheral 10 may prohibit communication, i.e., transmission and reception, in the network connected to the first port 11 and permit connection to the general LAN 30 with the use of the setting information 13B at the second port 12. Furthermore, in step S520 illustrated in FIG. 13, the multifunction peripheral 10 may display a notification such as the one illustrated in FIG. 16 on the display 16, for example. The multifunction peripheral 10 may perform the network connection operation as described above.

[Example Effects]

Next, some example effects of the multifunction peripheral 10 and the network connection determining method in the multifunction peripheral 10 according to the example embodiment will be described.

In the example embodiment, the multifunction peripheral 10 may be provided with the two wired LAN ports, i.e., the first port 11 and the second port 12. In the multifunction peripheral 10, network connection to the first port 11 may be made in accordance with the setting information 13B. The multifunction peripheral 10 may determine, on the basis of the result from the connection, whether the network connection to the first port 11 is made properly. In this manner, improper network connection to the first port 11 may be detected not with the use of the setting information 13A to be used when connection to the classified LAN 20 with a high security level is to be made but with the use of the setting information 13B to be used when connection to the general LAN 30 with a low security level is to be made in the multifunction peripheral 10. This allows for prevention of transmitting the connection destination information of the classified LAN 20 accidentally to a network connected improperly. As a result, it is possible to avoid a risk of lowering the security level of the classified LAN 20.

Furthermore, in the example embodiment, it may be determined whether the network connection to the first port 11 is made properly, on the basis of whether a proper response to an inquiry, i.e., a ping, based on the setting information 13B is received. In this manner, improper network connection to the first port 11 may be detected not with the use of the setting information 13A to be used when connection to the classified LAN 20 with a high security level is to be made but with the use of the setting information 13B to be used when connection to the general LAN 30 with a low security level is to be made in the multifunction peripheral 10. This allows for prevention of transmitting the connection destination information of the classified LAN 20 accidentally to a network connected improperly. As a result, it is possible to avoid the risk of lowering the security level of the classified LAN 20.

Furthermore, in the example embodiment, networks may be connected to the first port 11 and the second port 12 in accordance with the setting information 13B. It may be determined, on the basis of the result from the connection, whether the network connection to the first port 11 and the second port 12 is made properly. In this manner, improper network connection to the first port 11 and the second port 12 may be detected not with the use of the setting information 13A to be used when connection to the classified LAN 20 with a high security level is to be made but with the use of the setting information 13B to be used when connection to the general LAN 30 with a low security level is to be made in the multifunction peripheral 10. This allows for prevention of transmitting the connection destination information of the classified LAN 20 accidentally to a network connected improperly. As a result, it is possible to avoid the risk of lowering the security level of the classified LAN 20.

Furthermore, in the example embodiment, in a case where networks are connected to the first port 11 and the second port 12 in accordance with the setting information 13B, it may be determined that the general LAN 30 and the classified LAN 20 are connected improperly to the first port 11 and the second port 12 when the network connection to the first port 11 is successful and the network connection to the second port 12 fails. In this manner, improper network connection to the first port 11 and the second port 12 may be detected not with the use of the setting information 13A to be used when connection to the classified LAN 20 with a high security level is to be made but with the use of the setting information 13B to be used when connection to the general LAN 30 with a low security level is to be made in the example embodiment. This allows for prevention of transmitting the connection destination information of the classified LAN 20 accidentally to a network connected improperly. As a result, it is possible to avoid the risk of lowering the security level of the classified LAN 20.

2. MODIFICATION EXAMPLES

Next, some modification examples of the multifunction peripheral 10 and the network connection determining method in the multifunction peripheral 10 according to the foregoing example embodiment will be described.

Modification Example A

In the example embodiment, the multifunction peripheral 10 may prohibit all communication, i.e., transmission and reception, in the networks connected to the first port 11 and the second port 12 in steps S300, S310, S400, and S410. Alternatively, in the example embodiment, the multifunction peripheral 10 may permit only the reception from the networks connected to the first port 11 and the second port 12 in steps S300, S310, S400, and S410. In this case, the multifunction peripheral 10 may connect to the networks connected to the first port 11 and the second port 12 with the use of the setting information 13B of the general LAN 30. In other words, in a case where an inquiry for the IP address is made by a network, the multifunction peripheral 10 may return the IP address to be used in the general LAN 30. This allows for prevention of transmitting the connection destination information of the classified LAN 20 accidentally to a network connected improperly. As a result, it is possible to avoid the risk of lowering the security level of the classified LAN 20.

Modification Example B

In the example embodiment and the modification example described above, the multifunction peripheral 10 may include two LAN ports, and the storage device 13 may hold the setting information 13A and the setting information 13B corresponding to the respective LAN ports. Alternatively, in the example embodiment, the multifunction peripheral 10 may include three or more LAN ports, and the storage device 13 may hold three or more pieces of setting information corresponding to the respective LAN ports. In this case, in one example embodiment, the multifunction peripheral 10 may compare the security levels described in the respective pieces of setting information and adopt the setting information with the lowest security level as the setting information for identification of the connection destination network. The setting information with the lowest security level may be referred to below as "setting information A". Furthermore, in accordance with the setting information A, the multifunction peripheral 10 may connect a network to a LAN port to which the network with the highest security level is to be connected. The LAN port to which the network with the highest security level is to be connected may be referred to below as a "LAN port α". In one example embodiment, the multifunction peripheral 10 may determine, on the basis of the result from the connection, whether the network connection to the LAN port α is made properly. Furthermore, in one example embodiment, in step S210, the multifunction peripheral 10 may adopt the setting information, in the increasing order of the security level, as the setting information for identification of the connection destination network and confirm the connection of the network connected to the LAN port to which it has been determined that the network connection has not been made properly on the basis of the setting information A. This allows for prevention of transmitting the connection destination information of the network with the highest security level accidentally to a network connected improperly. As a result, it is possible to avoid the risk of lowering the security level of the network with the highest security level.

Modification Example C

Figure 17:
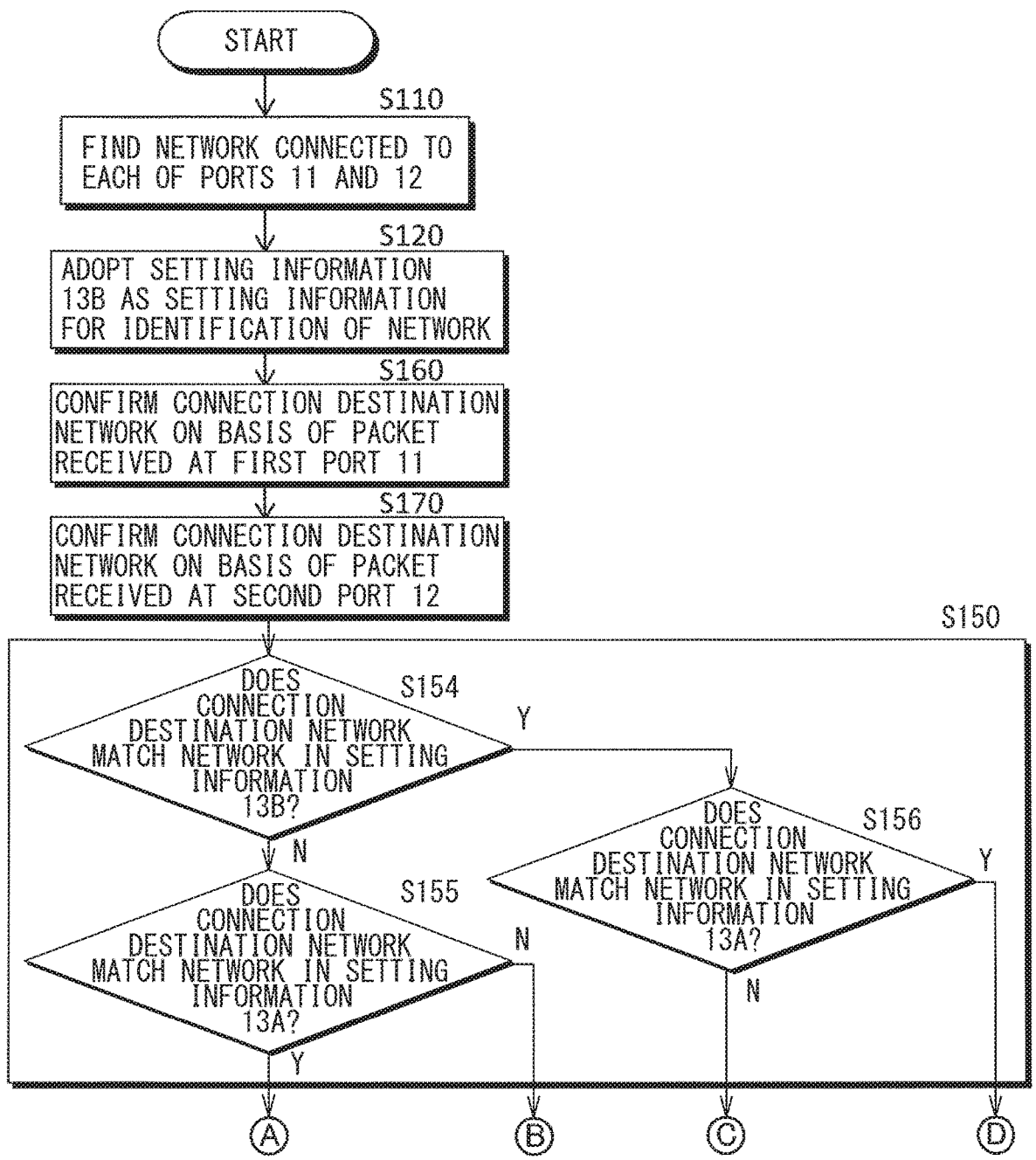
FIG. 17 is a diagram illustrating one modification example of the operation illustrated in FIG. 7.

In the example embodiment and the modification examples described above, the multifunction peripheral 10 may determine whether the network connection is made properly, on the basis of whether the connection to the destination IP address for confirmation of the network connection included in the setting information 13B is successful. Alternatively, in the example embodiment and the modification examples described above, in a case where the network connection confirming method described in the setting information 13B indicates "packet reception", the multifunction peripheral 10 may receive a packet inputted through the network at the first port 11 and confirm the connection destination network on the basis of the received packet in step S160, as illustrated in FIG. 17, for example. Furthermore, the multifunction peripheral 10 may receive a packet inputted through the network at the second port 12 and confirm the connection destination network on the basis of the received packet in step S170, as illustrated in FIG. 17, in one example embodiment. Furthermore, the multifunction peripheral 10 may determine whether the connection destination network identified through the above-described confirmation matches the network in the setting information 13B in step S154, as illustrated in FIG. 17, for example. In a case where the connection destination network identified through the above-described confirmation does not match the network in the setting information 13B as a result (N in step S154), the multifunction peripheral 10 may proceed to step S155. In step S155, the multifunction peripheral 10 may determine whether the connection destination network identified through the above-described confirmation matches the network in the setting information 13A, as illustrated in FIG. 17, for example. In a case where the connection destination network identified through the above-described confirmation matches the network in the setting information 13A as a result (Y in step S155), the multifunction peripheral 10 may proceed to step S200 illustrated in FIG. 18 which will be described later. In a case where the connection destination network identified through the above-described confirmation does not match the network in the setting information 134 in step S155 (N in step S155), the multifunction peripheral 10 may proceed to step S300 illustrated in FIG. 13. In a case where the connection destination network identified through the above-described confirmation matches the network in the setting information 13B in step S154 (Y in step S154), the multifunction peripheral 10 may proceed to step S156. In step S156, the multifunction peripheral 10 may determine whether the connection destination network identified through the above-described confirmation matches the network in the setting information 13A, as illustrated in FIG. 17, for example. In a case where the connection destination network identified through the above-described confirmation does not match the network in the setting information 13A as a result (N in step S156), the multifunction peripheral 10 may proceed to step S400 illustrated in FIG. 13. In a case where the connection destination network identified through the above-described confirmation matches the network in the setting information 13A in step S156 (Y in step S156), the multifunction peripheral 10 may proceed to step S500 illustrated in FIG. 13.

Figure 18:
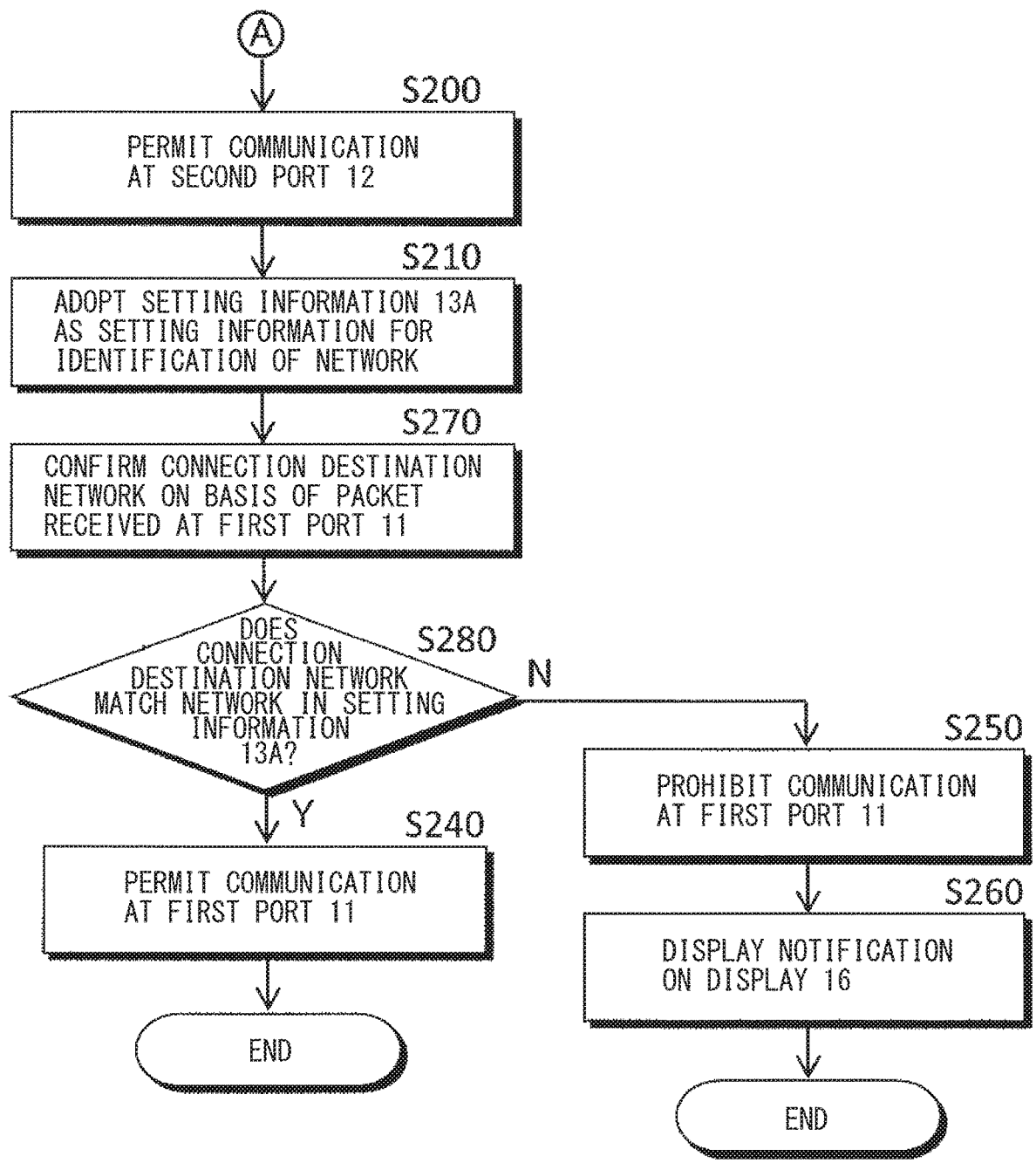
FIG. 18 is a diagram illustrating an example of operation that follows A illustrated in FIG. 17.

Furthermore, in the example embodiment and the modification examples described above, in a case where the network connection confirming method described in the setting information 13A indicates "packet reception", the multifunction peripheral 10 may receive a packet inputted through the network at the first port 11 and confirm the connection destination network on the basis of the received packet in step S270, as illustrated in FIG. 18, in one example. In this case, the multifunction peripheral 10 may determine whether the network in the setting information 13A matches the connection destination network in step S280 as illustrated in FIG. 18, for example. In a case where the network in the setting information 13A matches the connection destination network as a result (Y in step S280), the multifunction peripheral 10 may proceed to step S240. In a case where the network in the setting information 13A does not match the connection destination network (N in step S280), the multifunction peripheral 10 may proceed to step S250.

The multifunction peripheral 10 may extract the network address with the use of the destination IP address of the received packet and a subnet mask included in the setting information 13B, for example. Furthermore, the multifunction peripheral 10 may be able to determine whether the network connection is made properly by comparing the extracted network address and the network address portion of the IP address included in the setting information 13B, for example.

In this manner, it may be determined whether the network connection to the first port 11 is made properly, on the basis of whether the packet received at the first port 11 is a packet corresponding to the setting information 13B in the present modification example. In this manner, improper network connection to the first port 11 may be detected not with the use of the setting information 13A to be used when connection to the classified LAN 20 with a high security level is to be made but with the use of the setting information 13B to be used when connection to the general LAN 30 with a low security level is to be made in the multifunction peripheral 10. This allows for prevention of transmitting the connection destination information of the classified LAN 20 accidentally to a network connected improperly. As a result, it is possible to avoid the risk of lowering the security level of the classified LAN 20.

Modification Example D

In the example embodiment and the modification examples described above, the setting information 13A and the setting information 13B may each include the destination IP address for confirmation of the network connection. Alternatively, in the example embodiment and the modification examples described above, the setting information 13A and the setting information 13B may each include an IP address of a domain name system (DNS) server, an IP address of a default gateway, or any other suitable IP address, for example, in place of the destination IP address for confirmation of the network connection. This allows the multifunction peripheral 10 to use the IP address of the DNS server, the IP address of the default gateway, or any other suitable IP address as an IP address to be used to make a connection attempt to any desired address within the network in order to confirm the network connection.

Modification Example E

In the example embodiment and the modification examples described above, a general information processing apparatus such as a personal computer may be provided in place of the multifunction peripheral 10. Effects similar to those of the example embodiment and the modification examples described above are obtainable also in this case.

Modification Example F

The series of processes described above referring to the example embodiment and the modification examples may be performed with hardware, i.e., a circuit, or software, i.e., a program. In a case where the series of processes are performed with software, the software may include a set of programs causing a computer to execute each operation. Each program may be incorporated in advance in the computer to be used or may be installed into the computer over a network or from a recording medium to be used, for example.

Furthermore, the technology encompasses any possible combination of some or all of the various embodiments and the modifications described herein and incorporated herein. It is possible to achieve at least the following configurations from the above-described example embodiments of the technology.

An information processing apparatus including:

a first port that is to be connected to a first network having a first security level;

a second port that is to be connected to a second network having a second security level, the second security level being lower than the first security level;

a storage device that holds first setting information for connection to the first network and second setting information for connection to the second network; and a determining unit that makes network connection to at least the first port in accordance with the second setting information and determines, on the basis of a result from the network connection to at least the first port in accordance with the second setting information, whether the network connection to the first port is made properly.

The information processing apparatus according to (1), in which the determining unit determines, on the basis of whether a proper response to an inquiry based on the second setting information is received, whether the network connection to the first port is made properly.

The information processing apparatus according to (1), in which the determining unit performs confirmation of a connection destination network on the basis of a packet received at the first port and determines, on the basis of whether the connection destination network identified by the confirmation matches a network in the second setting information, whether the network connection to the first port is made properly, the connection destination network being a network to which connection is to be made.

The information processing apparatus according to (1) or (2), in which the determining unit makes network connection to the first port and the second port in accordance with the second setting information and determines, on the basis of a result from the network connection to the first port and the second port in accordance with the second setting information, whether the network connection to the first port and the second port is made properly.

The information processing apparatus according to (4), in which the determining unit determines that the first network and the second network are connected improperly to the first port and the second port in a case where the network connection to the first port is successful and the network connection to the second port fails.

A network connection determining method in an information processing apparatus that includes a first port and a second port, the first port being to be connected to a first network having a first security level, the second port being to be connected to a second network having a second security level lower than the first security level, the network connection determining method including:

making network connection to at least the first port in accordance with setting information for connection to the second network; and determining, on the basis of a result from the making the network connection to at least the first port in accordance with setting information for the connection to the second network, whether the network connection to the first port is made properly.

According to the information processing apparatus and the network connection determining method of one embodiment of the technology, it is possible to avoid a risk of lowering a security level of a network with a high security level.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An information processing apparatus comprising:
   a first wired port that is to be connected to a first network having a first security level;
   a second wired port that is to be connected to a second network having a second security level, the second security level being lower than the first security level;
   a storage device that holds first setting information for connection to the first network and second setting information for connection to the second network; and
   a controller circuit configured to make network connection to at least the first wired port in accordance with the second setting information and determine, on a basis of a result from the network connection to at least the first wired port in accordance with the second setting information, whether the network connection to the first wired port is made properly, wherein
   the first setting information includes an address of a first device to be connected to the first network,
   the second setting information includes an address of a second device to be connected to the second network, and
   the controller circuit is configured to:
      make a first packet communication to the first network and the second network, the first packet communication including the address of the second device, and
      make a second packet communication to the first network when the first packet communication to the second network is successful and the first packet communication to the first network fails, the second packet communication including the address of the first device.

2. The information processing apparatus according to claim 1, wherein the controller circuit is configured to determine, on a basis of whether a proper response to an inquiry based on the the address of the second device is received, whether the first packet communication to the first network and the second network is made properly.

3. The information processing apparatus according to claim 1, wherein the controller circuit is configured to perform confirmation of a connection destination network on a basis of a packet received by the first network and the second network and determines, on a basis of whether the connection destination network identified by the confirmation matches a network in the second setting information, whether the first packet communication to the first network and the second network is made properly, the connection destination network being a network to which connection is to be made.

4. The information processing apparatus according to claim 1, wherein upon making the first packet communication that includes the address of the second device to the second network and determining that the first packet communication to the second network fails, the controller circuit is configured to issue a warning without making the second packet communication that includes the address of the first device.

5. The information processing apparatus according to claim 1, wherein upon making the first packet communication that includes the address of the second device to the first network and determining that the first packet communication to the first network is successful, the controller circuit is configured to issue a warning without making the packet communication that includes the address of the first device.

6. The information processing apparatus according to claim 1, wherein
   the first network comprises a first wired local area network,
   the second network comprises a second wired local area network,
   the first wired local area network and the second wired local area network are separated from each other physically or logically,
   the first wired port comprises a wired local area network port to which the first wired local area network is to be connected, and allows for connection of the second wired local area network in place of the first wired local area network,
   the second wired port comprises a wired local area network port to which the second wired local area network is to be connected, and allows for connection of the first wired local area network in place of the second wired local area network, the first setting information includes the address of the first device that is to be connected to the first wired local area network, and the second setting information includes the address of the second device that is to be connected to the second wired local area network.

7. The information processing apparatus according to claim 1, wherein the second network comprises a network that is able to be connected to the Internet, and the first network and the second network are separated from each other physically or logically.

8. The information processing apparatus according to claim 1, wherein the second network comprises the Internet, and the address of the second device comprises an address of a default gateway.

9. A network connection determining method in an information processing apparatus that includes a first wired port and a second wired port, the first wired port configured to be connected to a first network having a first security level, the second wired port configured to be connected to a second network having a second security level lower than the first security level, the network connection determining method comprising:

making network connection to at least the first wired port in accordance with setting information for connection to the second network;

determining, on a basis of a result from the making the network connection to at least the first wired port in accordance with setting information for the connection to the second network, whether the network connection to the first wired port is made properly;

making a first packet communication to the first network and the second network, the first packet communication including an address of a second device, the second device being configured to be connected to the second network; and making a second packet communication to the first network when the first packet communication to the second network is successful and the first packet communication to the first network fails, the second packet communication including an address of a first device, the first device being configured to be connected to the first network.

10. The network connection determining method according to claim 9, wherein the second network comprises the Internet, and the address of the second device comprises an address of a default gateway.

11. An information processing apparatus comprising:

a first wired port that is to be connected to a first network having a first security level;

a second wired port that is to be connected to a second network having a second security level;

a storage device that holds first setting information for connection to the first network and second setting information for connection to the second network; and a controller circuit configured to make network connection to at least the first wired port in accordance with the second setting information and determine, on a basis of a result from the network connection to at least the first wired port in accordance with the second setting information, whether the network connection to the first wired port is made properly, wherein the first setting information includes an address of a first device to be connected to the first network, the second setting information includes an address of a second device to be connected to the second network, and the controller circuit is configured to:

make a first packet communication to the first network and the second network, the first packet communication including the address of the second device, and make a second packet communication to the first network when the first packet communication to the second network is successful and the first packet communication to the first network fails, the second packet communication including the address of the first device.

12. The information processing apparatus according to claim 11, wherein the second network comprises the Internet, and the address of the second device comprises an address of a default gateway.

* * * * *